(12) United States Patent
Buckland et al.

(10) Patent No.: US 8,763,633 B2
(45) Date of Patent: Jul. 1, 2014

(54) VALVE

(75) Inventors: Justin Rorke Buckland, Cambridge (GB); James Edward McCrone, Cambridge (GB); Stuart Andrew Hatfield, Cambridge (GB)

(73) Assignee: The Technology Partnership PLC, Hertfordshire (GB)

( * ) Notice: Subject to any disclaimer, the term of this patent is extended or adjusted under 35 U.S.C. 154(b) by 274 days.

(21) Appl. No.: 13/376,017

(22) PCT Filed: Jun. 3, 2009

(86) PCT No.: PCT/GB2009/050614
§ 371 (c)(1),
(2), (4) Date: Feb. 22, 2012

(87) PCT Pub. No.: WO2010/139917
PCT Pub. Date: Dec. 9, 2010

(65) Prior Publication Data
US 2012/0138180 A1    Jun. 7, 2012

(51) Int. Cl.
*F16K 21/04*    (2006.01)
(52) U.S. Cl.
USPC .................. 137/512.15; 137/493; 137/625.33
(58) Field of Classification Search
USPC ............ 137/512.15, 516.13, 625.33, 625.28, 137/601.03, 601.01, 493
See application file for complete search history.

(56) References Cited

U.S. PATENT DOCUMENTS

| 4,231,394 | A | * | 11/1980 | Hrabal et al. | 137/512 |
| 4,402,342 | A | * | 9/1983 | Paget | 137/512.15 |
| 4,516,602 | A | * | 5/1985 | Ludenbach et al. | 137/512.15 |
| 4,852,608 | A | * | 8/1989 | Bennitt | 137/516.13 |
| 5,587,128 | A | * | 12/1996 | Wilding et al. | 422/50 |
| 2002/0129857 | A1 | | 9/2002 | Xu et al. | |
| 2003/0234376 | A1 | | 12/2003 | Cabuz et al. | |
| 2009/0181411 | A1 | * | 7/2009 | Battrell et al. | 435/7.92 |

FOREIGN PATENT DOCUMENTS

| DE | 26 03 712 A1 | 8/1977 |
| GB | 690897 A | 4/1953 |
| WO | WO-2008/022048 A2 | 2/2008 |

OTHER PUBLICATIONS

Laser and Santiago, "A Review of Micropumps", J. Micrometh. Microeng., vol. 14, 2004, pp. R35-R64.

* cited by examiner

*Primary Examiner* — John K Fristoe, Jr.
*Assistant Examiner* — Reinaldo Sanchez-Medina
(74) *Attorney, Agent, or Firm* — Tarolli, Sundheim, Covell & Tummino LLP

(57) ABSTRACT

A valve for controlling the flow of fluid having first (16) and second (14) plates with offsetting apertures and a sidewall (12) disposed between the plates around the perimeter of the plates to form a cavity (15) in fluid communication with the apertures is disclosed. The valve further comprises a flap (17) disposed and moveable between the first and second plates and having apertures (22) substantially offset from the apertures (20) of one plate (16) and substantially aligned with the apertures (18) of the other plate (14). The flap is motivated between the two plates in response to a change in direction of the differential pressure of fluid across the valve.

26 Claims, 10 Drawing Sheets

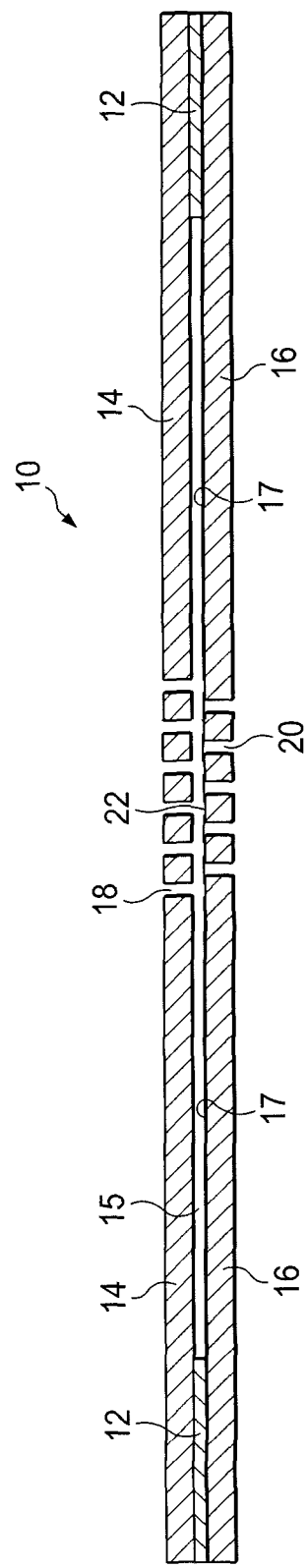
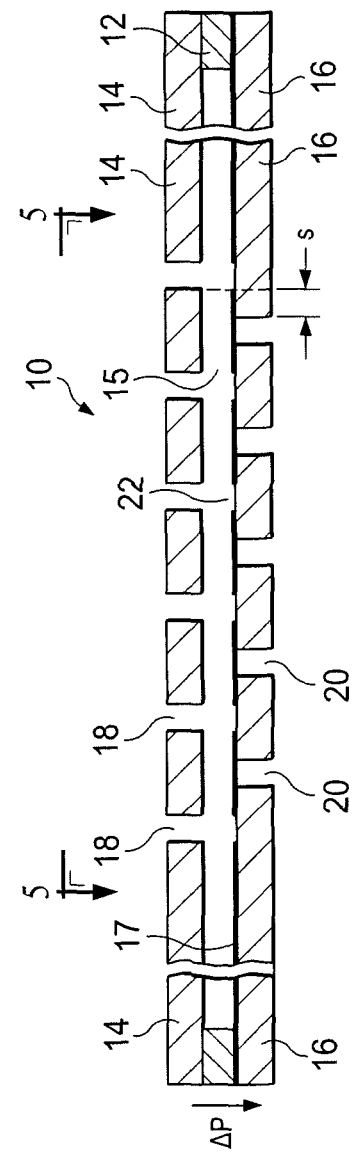
FIG. 1A
FIG. 1B

VALVE

BACKGROUND OF THE INVENTION

1. Field of the Invention

The illustrative embodiments relate generally to a valve for controlling fluid flow therethrough and, more specifically, to a valve having a flap that is disposed between two plates and capable of movement between an open and closed position.

2. Description of Related Art

Conventional valves typically operate at lower frequencies below 500 Hz for a variety of applications. For example, many conventional compressors typically operate at 50 or 60 Hz. A linear resonance compressor known in the art operates between 150 and 350 Hz. Such pumps are typically relatively large, and produce audible noise in operation. However, many portable electronic devices including medical devices require pumps for delivering a positive pressure or providing a vacuum that are relatively small in size and it is advantageous for such pumps to be inaudible in operation so as to provide discrete operation.

To achieve the objectives of small size, high efficiency, and inaudible operation, certain pumps (such as that described in Applicant's co-pending Patent Application, Applicant's Reference No. DP3) must operate at very high frequencies, in turn requiring valves that must operate at very high frequencies to be effective. Such pumps require valves capable of operating at much higher frequencies of around 20 kHz and higher which are not commonly available. To operate at these high frequencies, the valve must be responsive to a high frequency oscillating pressure that can be rectified to create a net flow of fluid through the pump.

SUMMARY

A valve for controlling the flow of fluid that is capable of operating at such higher frequencies is disclosed. The valve comprises a first plate having apertures extending generally perpendicular therethrough and a second plate also having apertures extending generally perpendicular therethrough, wherein the apertures of the second plate are substantially offset from the apertures of the first plate. The valve further comprises a sidewall disposed between the first and second plate, wherein the sidewall is closed around the perimeter of the first and second plates to form a cavity between the first and second plates in fluid communication with the apertures of the first and second plates. The valve further comprises a flap disposed and moveable between the first and second plates, wherein the flap has apertures substantially offset from the apertures of the first plate and substantially aligned with the apertures of the second plate. The flap is motivated between the first and second plates in response to a change in direction of the differential pressure of the fluid across the valve.

Other objects, features, and advantages of the illustrative embodiments are disclosed herein and will become apparent with reference to the drawings and detailed description that follow.

BRIEF DESCRIPTION OF THE DRAWINGS

FIG. 1A shows a schematic cross-section view of an illustrative embodiment of a valve in a closed position, and FIG. 1B shows an exploded, sectional view of the valve of FIG. 1A taken along line 1B-1B in FIG. 5;

DETAILED DESCRIPTION OF ILLUSTRATIVE EMBODIMENTS

In the following detailed description of several illustrative embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Figure 2:
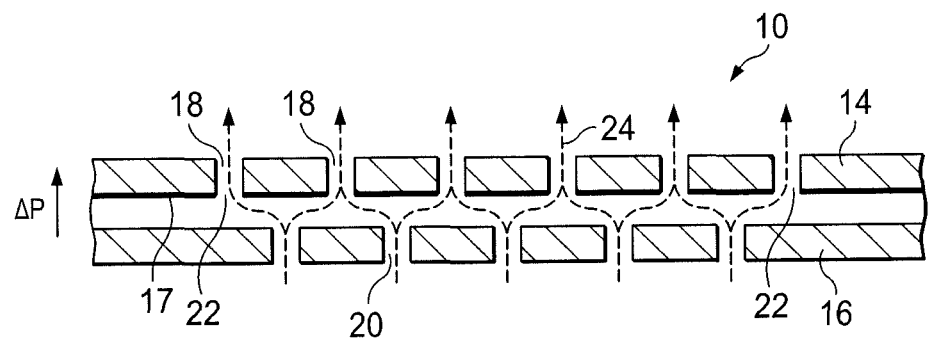
FIG. 2 shows a schematic cross-section view of the valve in FIG. 1B in an open position while fluid flows therethrough.
Figure 3:
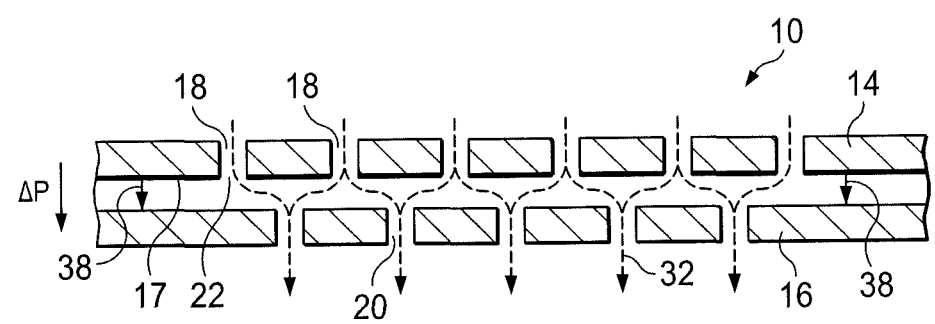
FIG. 3 shows a schematic cross-section view of the valve in FIG. 1B in transition between the open and closed positions.
Figure 4:
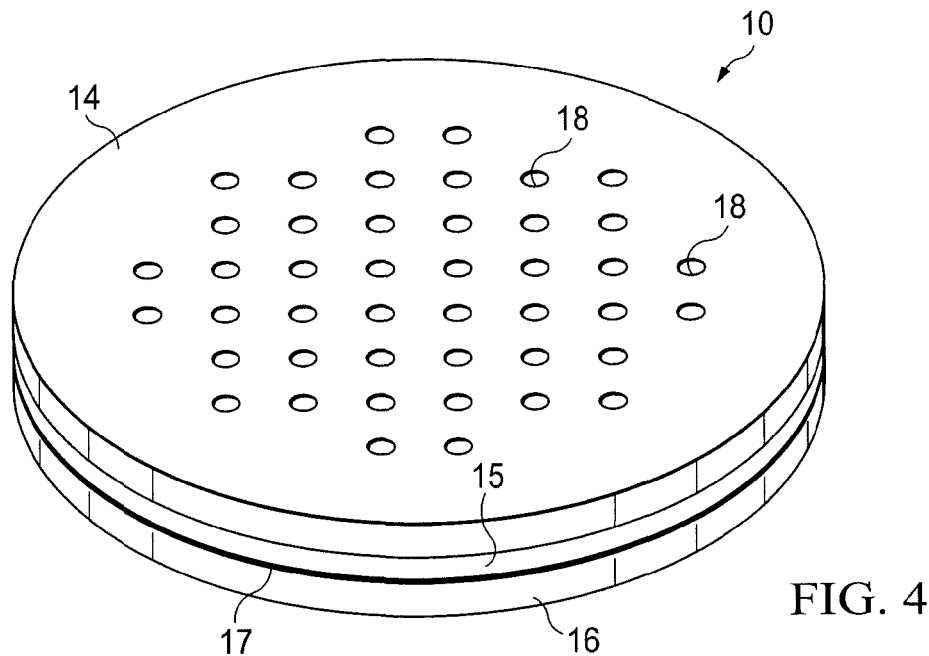
FIG. 4 shows a schematic perspective view of the valve of FIG. 1B.

Referring to FIGS. 1A to 5, a valve 10 is shown according to an illustrative embodiment. The valve 10 comprises a substantially cylindrical wall 12 that is ring-shaped and closed at one end by a retention plate 14 and at the other end by a sealing plate 16. The inside surface of the wall 12, the retention plate 14, and the sealing plate 16 form a cavity 15 within the valve 10. The valve 10 further comprises a substantially circular flap 17 disposed between the retention plate 14 and the sealing plate 16, but adjacent to the sealing plate 16 as shown in FIGS. 1A and 1B. The flap 17 may be disposed adjacent the retention plate 14 in an alternative embodiment as will be described in more detail below, and in this sense the flap 17 is considered to be "biased" against either one of the sealing plate 16 or the retention plate 14. The peripheral portion of the flap 17 is sandwiched between the sealing plate 16 and the ring-shaped wall 12 so that the motion of the flap 17 is restrained in the plane substantially perpendicular the surface of the flap 17. The motion of the flap 17 in such plane may also be restrained by the peripheral portion of the flap 17 being attached directly to either the sealing plate 16 or the wall 12, or by the flap 17 being a close fit within the ring-shaped wall 12, in alternative embodiments. The remainder of the flap 17 is sufficiently flexible and movable in a direction substantially perpendicular the surface of the flap 17, so that a force applied to either surface of the flap 17 will motivate the flap 17 between the sealing plate 16 and the retention plate 14 as shown in FIGS. 1B, 2 and 3.

The retention plate 14 and the sealing plate 16 both have holes 18 and 20, respectively, which extend through each plate as shown in the cross-sectional view of FIGS. 1-3. The flap 17 also has holes 22 that are generally aligned with the holes 18 of the retention plate 14 to provide a passage through which fluid, including a gas or liquid, may flow as indicated by the dashed arrows 24 in FIG. 2. The holes 22 in the flap 17 may also be partially aligned, i.e., having only a partial overlap, with the holes 18 in the retention plate 14. Although the holes 18, 20, 22 are shown to be of substantially uniform size and shape, they may be of different diameters or even different shapes without limiting the scope of the invention. In one embodiment of the invention, the holes 18 and 20 form an alternating pattern across the surface of the plates as shown by the solid and dashed circles, respectively, in FIGS. 4 and 5. In other embodiments, the holes 18, 20, 22 may be arranged in different patterns without effecting the operation of the valve 10 with respect to the functioning of the individual pairings of holes 18, 20, 22 as illustrated by individual sets of the dashed arrows 24, 36. The pattern of holes 18, 20, 22 may be designed to increase or decrease the number of holes to control the total flow of fluid through the valve 10 as required. For example, the number of holes 18, 20, 22 may be increased to reduce the flow resistance of the valve 10 to increase the total flow rate of the valve 10.

When no force is applied to either surface of the flap 17 to overcome the bias of the flap 17, the valve 10 is in a "normally closed" position because the flap 17 is biased against the sealing plate 16 and the holes 22 of the flap are offset or not aligned with the holes 18 of the sealing plate 16. In this "normally closed" position, the flow of fluid through the sealing plate 16 is substantially blocked or covered by the non-perforated portions of the flap 17 as shown in FIG. 1B. When pressure is applied against either side of the flap 17 that overcomes the bias of the flap 17 and motivates the flap 17 away from the sealing plate 16 towards the retention plate 14 as shown in FIG. 2, the valve 10 moves from the normally closed position to an "open" position over a time period, an opening time delay ($T_o$), allowing fluid to flow in the direction indicated by the dashed arrows 24. When the pressure changes direction, the flap 17 will be motivated back towards the sealing plate 16 to the normally closed position. If the pressure changes direction, fluid will flow for a short time period, a closing time delay ($T_c$), in the opposite direction as indicated by the dashed arrows 32 shown in FIG. 3 until the flap 17 seals the holes 20 of the sealing plate 16 to substantially block fluid flow through the sealing plate 16 as shown in FIG. 1B. In other embodiments of the invention, the flap 17 may be biased against the retention plate 14 with the holes 18, 22 aligned in a "normally open" position. In this embodiment, applying a positive pressure against the flap 17 will motivate the flap 17 into a "closed" position. Note that the terms "sealed" and "blocked" as used herein in relation to valve operation are intended to include cases in which substantial (but incomplete) sealing or blockage occurs, such that the flow resistance of the valve is greater in the "closed" position than in the "open" position.

The operation of the valve 10 is a function of the change in direction of the differential pressure ($\Delta P$) of the fluid across the valve 10. In FIG. 1B, the differential pressure has been assigned a negative value ($-\Delta P$) as indicated by the downward pointing arrow. In this embodiment, when the differential pressure has a negative value ($-\Delta P$), the fluid pressure on the retention plate side 34 of the valve 10 is greater than the fluid pressure on the sealing plate side 36 of the valve 10. This negative differential pressure ($-\Delta P$) drives the flap 17 into the fully closed position as described above wherein the flap 17 is pressed against the sealing plate 16 to block the holes 20 in the sealing plate 16, thereby substantially preventing the flow of fluid through the valve 10. When the differential pressure across the valve 10 reverses to become a positive differential pressure ($+\Delta P$) as indicated by the upward pointing arrow in FIG. 2, the flap 17 is motivated away from the sealing plate 16 and towards the retention plate 14 into the open position. In this embodiment, when the differential pressure has a positive value ($+\Delta P$), the fluid pressure on the sealing plate side 36 of the valve 10 is greater than the fluid pressure on the retention plate side 34 of the valve 10. In the open position, the movement of the flap 17 unblocks the holes 20 of the sealing plate 16 so that fluid is able to flow through them and the aligned holes 22 and 18 of the flap 17 and the retention plate 14, respectively, as indicated by the dashed arrows 24.

When the differential pressure across the valve 10 changes back to a negative differential pressure ($-\Delta P$) as indicated by the downward pointing arrow in FIG. 3, fluid begins flowing in the opposite direction through the valve 10 as indicated by the dashed arrows 32, which forces the flap 17 back toward the closed position shown in FIG. 1B. In FIG. 3, the fluid pressure between the flap 17 and the sealing plate 16 is lower than the fluid pressure between the flap 17 and the retention plate 14. Thus, the flap 17 experiences a net force, represented by arrows 38, which accelerates the flap 17 toward the sealing plate 16 to close the valve 10. In this manner, the changing differential pressure cycles the valve 10 between closed and open positions based on the direction (i.e., positive or negative) of the differential pressure across the valve 10. It should be understood that the flap 17 could be biased against the retention plate 14 in an open position when no differential pressure is applied across the valve 10, i.e., the valve 10 would then be in a "normally open" position.

Figure 6:
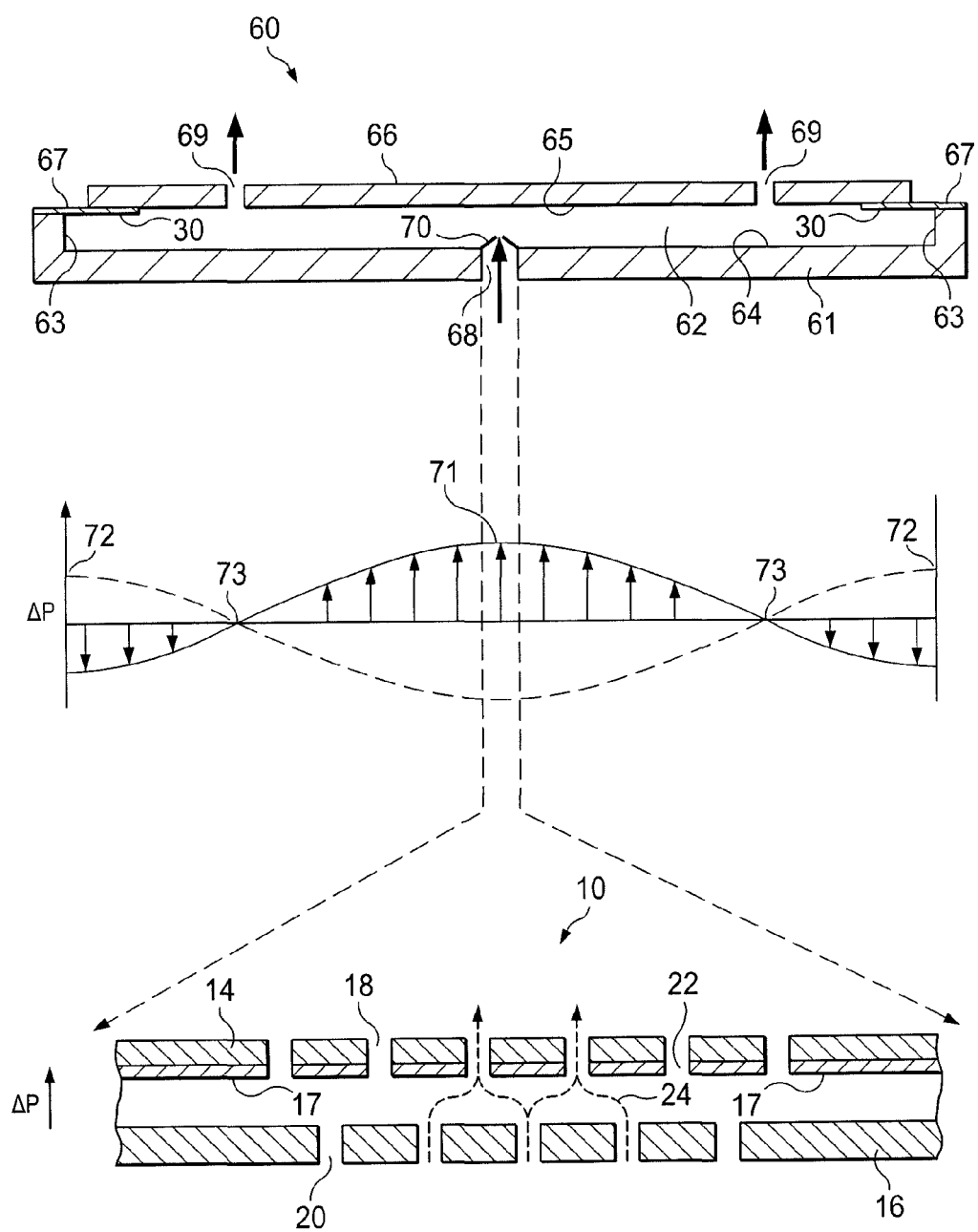
FIG. 6 shows a schematic cross-section view of a disc pump utilizing a valve, a graph of pressure oscillations of fluid within the pump, and an exploded cross-sectional view of the valve of FIG. 1B in an open position as utilized in the pump.

As indicated above, the valve 10 may be used in a pump that operates at extremely high frequencies, beyond the range of human hearing. At such frequencies, the pump may be extremely small in size and suitable for integration into a wide range of portable electronic devices where pressure or vacuum delivery is required. Such a pump 60 is shown in FIG. 6. The pump 60 comprises a pump body 61 having a substantially cylindrical shape cavity 62 formed by a side wall 63 and closed at both ends by substantially circular end walls 64, 65 for containing a fluid. The pump 60 further comprises an actuator 66 operatively associated with the central portion of the end wall 65 to cause an oscillatory motion of the end wall 65 in a direction substantially perpendicular thereto with maximum amplitude at about the center of the end wall 65, thereby generating displacement oscillations of the end wall 65 when in use. The pump 60 further comprises an isolator 67 operatively associated with the peripheral portion of the end wall 65 to reduced dampening of displacement oscillations caused by the end wall's 65 connection to the side wall 63 of the cavity 62. The pump 60 further comprises a central aperture 68 disposed at about the center of the end wall 64 and two secondary apertures 69 disposed between the center of the end wall 65 and the side wall 63. When the actuator 66 generates an oscillatory motion of the end wall 65, the displacement oscillations generate radial oscillations of the fluid pressure within the cavity 62 of the pump body 61. The pump 60 also comprises a valve 70 disposed in the central aperture 68 that allows fluid to flow through the central aperture 68 substantially in only one direction, the pump in operation causing fluid flow through the apertures 68, 69 as indicated by the arrows. For this valve 70 to operate at high frequencies generated by the actuator 66, the valve 70 must have an extremely fast response time such that it is able to open and close on a time scale significantly shorter than the time scale of the pressure variations. One embodiment of the valve 70 that can be used is the valve 10 shown in FIG. 6 in an exploded view.

The valve 10 is disposed within the central aperture 68 so that the fluid is drawn into the cavity 62 through the primary aperture 68 and expelled from the cavity 62 through the secondary apertures 69 as indicated by the solid arrows, thereby providing a source of reduced pressure at the primary aperture 68. The term "reduced pressure" as used herein generally refers to a pressure less than the ambient pressure where the pump 60 is located. Although the term "vacuum" and "negative pressure" may be used to describe the reduced pressure, the actual pressure reduction may be significantly less than the pressure reduction normally associated with a complete vacuum. The pressure is "negative" in the sense that it is a gauge pressure, i.e., the pressure is reduced below ambient atmospheric pressure. Unless otherwise indicated, values of pressure stated herein are gauge pressures. References to increases in reduced pressure typically refer to a decrease in absolute pressure, while decreases in reduced pressure typically refer to an increase in absolute pressure.

FIG. 6 also shows one possible pressure oscillation profile illustrating the pressure oscillation within the cavity 62 resulting from the axial displacement oscillations of the end wall 65. The solid curved line and arrows represent the pressure at one point in time, and the dashed curved line represents the pressure one half-cycle later. In this mode and higher-order modes, the amplitude of the pressure oscillations has a central pressure anti-node 71 near the centre of the cavity 62 and a peripheral pressure anti-node 72 near the side wall 63 of the cavity 62. The amplitude of the pressure oscillations is substantially zero at an annular pressure node 73 between the central pressure anti-node 71 and the peripheral pressure anti-node 72. For a cylindrical cavity, the radial dependence of the amplitude of the pressure oscillations in the cavity 62 may be approximated by a Bessel function of the first kind. The pressure oscillations described above result from the radial movement of fluid in the cavity 62, and so will be referred to as the "radial pressure oscillations" of the fluid within the cavity 62 as distinguished from the "axial displacement oscillations" of the actuator 66.

The fluid flow through the primary aperture 68 as indicated by the solid arrow pointing upwards corresponds to the fluid flow through the holes 18, 20 of the valve 10 as indicated by the dashed arrows that also point upwards. As indicated above, the operation of the valve 10 is a function of the change in direction of the differential pressure ($\Delta P$) of the fluid across the entire surface of the retention plate 14 of the valve 10 for this embodiment of a negative pressure pump. The differential pressure ($\Delta P$) is assumed to be substantially uniform across the entire surface of the retention plate 14 because the diameter of the retention plate 14 is small relative to the wavelength of the pressure oscillations in the cavity 62 and furthermore because the valve is located in the primary aperture 68 near the centre of the cavity 62 where the amplitude of the central pressure anti-node 71 is relatively constant. When the differential pressure across the valve 10 reverses to become a positive differential pressure ($+\Delta P$) corresponding to FIG. 2, the biased flap 17 is motivated away from the sealing plate 16 towards the retention plate 14 into the open position. In this position, the movement of the flap 17 unblocks the holes 20 of the sealing plate 16 so that fluid is permitted to flow through them and the aligned holes 18 of the retention plate 14 and the holes 22 of the flap 17 as indicated by the dashed arrows 24. When the differential pressure changes back to the negative differential pressure ($-\Delta P$), fluid begins to flow in the opposite direction through the valve 10 (see FIG. 3), which forces the flap 17 back toward the closed position (see FIG. 1B). Thus, as the pressure oscillations in the cavity 62 cycle the valve 10 between the normally closed and open positions, the pump 60 provides a reduced pressure every half cycle when the valve 10 is in the open position.

Figures 7A, 7B:
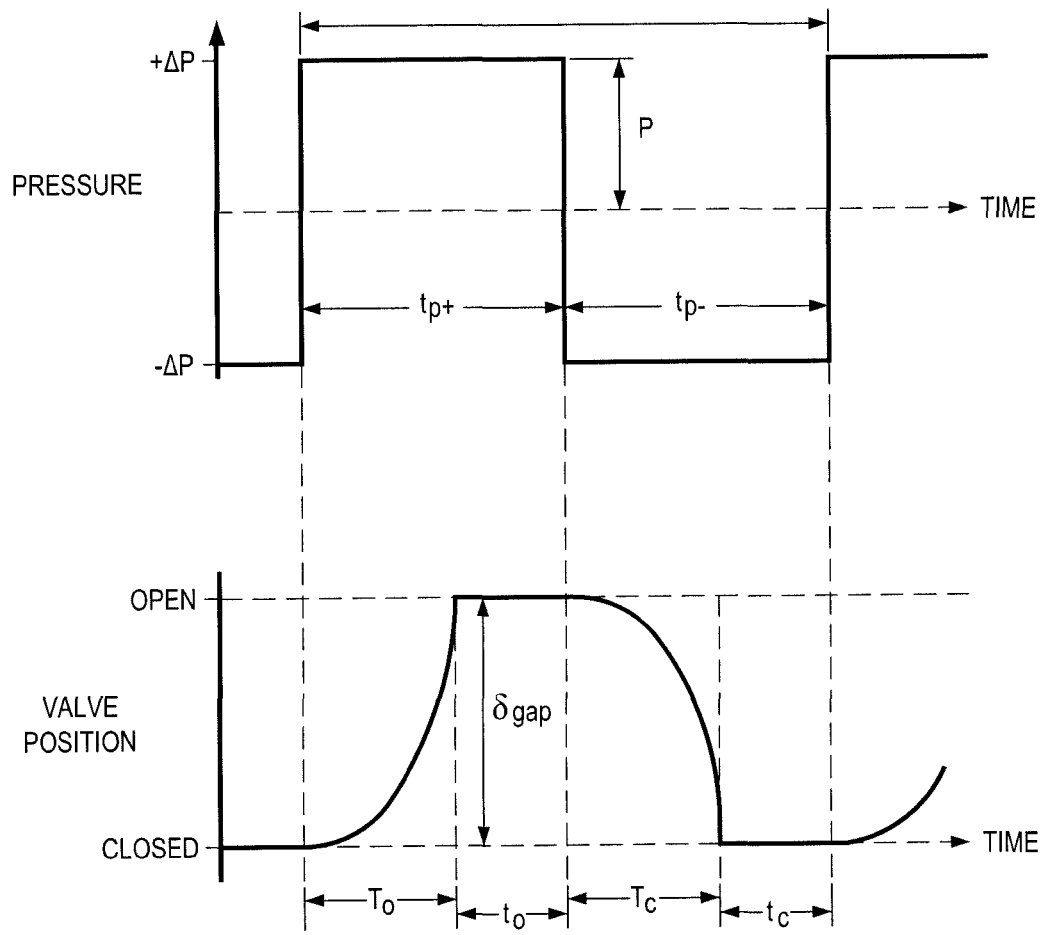
FIG. 7A shows a graph of an oscillating differential pressure applied across the valve of FIG. 1B according to an illustrative embodiment.
FIG. 7B shows a graph of an operating cycle of the valve of FIG. 1B between an open and closed position.

The differential pressure ($\Delta P$) is assumed to be substantially uniform across the entire surface of the retention plate 14 because it corresponds to the central pressure anti-node 71 as described above, it therefore being a good approximation that there is no spatial variation in the pressure across the valve 10. While in practice the time-dependence of the pressure across the valve may be approximately sinusoidal, in the analysis that follows it shall be assumed that the cycling of the differential pressure ($\Delta P$) between the positive differential pressure ($+\Delta P$) and negative differential pressure ($-\Delta P$) values can be approximated by a square wave over the positive pressure time period ($t_{P+}$) and the negative pressure time period ($t_{P-}$), respectively, as shown in FIG. 7A. As differential pressure ($\Delta P$) cycles the valve 10 between the normally closed and open positions, the pump 60 provides a reduced pressure every half cycle when the valve 10 is in the open position subject to the opening time delay ($T_o$) and the closing time delay ($T_c$) as also described above and as shown in FIG. 7B. When the differential pressure across the valve 10 is initially negative with the valve 10 closed (see FIG. 1B) and reverses to become a positive differential pressure ($+\Delta P$), the biased flap 17 is motivated away from the sealing plate 16 towards the retention plate 14 into the open position (see FIG. 2) after the opening time delay ($T_o$). In this position, the movement of the flap 17 unblocks the holes 20 of the sealing plate 16 so that fluid is permitted to flow through them and the aligned holes 18 of the retention plate 14 and the holes 22 of the flap 17 as indicated by the dashed arrows, thereby providing a source of reduced pressure outside the primary aperture 68 of the pump 60 over an open time period ($t_o$). When the differential pressure across the valve 10 changes back to the negative differential pressure ($-\Delta P$), fluid begins to flow in the opposite direction through the valve 10 (see FIG. 3) which forces the flap 17 back toward the closed position after the closing time delay ($T_c$). The valve 10 remains closed for the remainder of the half cycle or closed time period ($t_c$).

The retention plate 14 and the sealing plate 16 should be strong enough to withstand the fluid pressure oscillations to which they are subjected without significant mechanical deformation. The retention plate 14 and the sealing plate 16 may be formed from any suitable rigid material such as glass, silicon, ceramic, or metal. The holes 18, 20 in the retention plate 14 and the sealing plate 16 may be formed by any suitable process including chemical etching, laser machining, mechanical drilling, powder blasting, and stamping. In one embodiment, the retention plate 14 and the sealing plate 16 are formed from sheet steel between 100 and 200 microns thick, and the holes 18, 20 therein are formed by chemical etching. The flap 17 may be formed from any lightweight material, such as a metal or polymer film. In one embodiment, when fluid pressure oscillations of 20 kHz or greater are present on either the retention plate side 34 or the sealing plate side 36 of the valve, the flap 17 may be formed from a thin polymer sheet between 1 micron and 20 microns in thickness. For example, the flap 17 may be formed from polyethylene terephthalate (PET) or a liquid crystal polymer film approximately 3 microns in thickness.

In order to obtain an order of magnitude estimate for the maximum mass per unit area of the flap 17 according to one embodiment of the invention, it is again assumed that the pressure oscillation across the valve 10 is a square wave as shown in FIG. 7A and that the full pressure differential is dropped across the flap 17. Further assuming that the flap 17 moves as a rigid body, the acceleration of the flap 17 away from the closed position when the differential pressure reverses from the negative to the positive value may be expressed as follows:

$$\ddot{x} = \frac{P}{m} \qquad \text{[Equation 1]}$$

where x is the position of the flap 17, $\ddot{x}$ represents the acceleration of the flap 17, P is the amplitude of the oscillating pressure wave, and m is the mass per unit area of the flap 17. Integrating this expression to find the distance, d, traveled by the flap 17 in a time t yields the following:

$$d = \frac{P}{2m} t^2 \qquad \text{[Equation 2]}$$

This expression may be used to estimate the opening time delay ($T_o$) and the closing time delay ($T_c$), in each case from the point of pressure reversal.

In one embodiment of the invention, the flap 17 should travel the distance between the retention plate 14 and the sealing plate 16, the valve gap ($v_{gap}$) being the perpendicular distance between the two plates, within a time period less than about one quarter (25%) of the time period of the differential pressure oscillation driving the motion of the flap 17, i.e., the time period of the approximating square wave ($t_{pres}$). Based on this approximation and the equations above, the mass per unit area of the flap 17 (m) is subject to the following inequality:

$$m < \frac{P}{2 d_{gap}} \frac{t_{pres}^2}{16}, \text{ or alternatively } m < \frac{P}{2 d_{gap}} \frac{1}{16 f^2} \qquad \text{[Equation 3]}$$

where $d_{gap}$ is the flap gap, i.e., the valve gap ($v_{gap}$) minus the thickness of the flap 17, and f is the frequency of the applied differential pressure oscillation (as illustrated in FIG. 6A). In one embodiment, P may be 15 kPa, f may be 20 kHz, and $d_{gap}$ may be 25 microns, indicating that the mass per unit area of the flap 17 (m) should be less than about 60 grams per square meter. Converting from mass per unit area of the flap 17 (m), the thickness of the flap 17 is subject to the following inequality:

$$\delta_{flap} < \frac{P}{2 d_{gap}} \frac{1}{16 f^2} \frac{1}{\rho_{flap}} \qquad \text{[Equation 4]}$$

where $\rho_{flap}$ is the density of the flap 17 material. Applying a typical material density for a polymer (e.g., approximately 1400 kg/m³), the thickness of the flap 17 according to this embodiment is less than about 45 microns for the operation of a valve 10 under the above conditions. Because the square wave shown in FIG. 7A in general over-estimates the approximately sinusoidal oscillating pressure waveform across the valve 10, and further because only a proportion of the pressure difference applied across the valve will act as an accelerating pressure difference on the flap, the initial acceleration of the flap 17 will be lower than estimated above and the opening time delay ($T_o$) will in practice be higher. Therefore, the limit on flap thickness derived above is very much an upper limit, and in practice, to compensate for the decreased acceleration of the flap 17, the thickness of the flap 17 may be reduced to satisfy the inequality of equation 4. The flap 17 is thinner so that it accelerates more quickly to ensure that the opening time delay ($T_o$) less than about one quarter (25%) of the time period of the differential pressure oscillation ($t_{pres}$).

Minimizing the pressure drop incurred as air flows through the valve 10 is important to maximizing valve performance as it affects both the maximum flow rate and the stall pressure that are achievable. Reducing the size of the valve gap ($v_{gap}$) between the plates or the diameter of the holes 18, 20 in the plates both increase the flow resistance and increase the pressure drop through the valve 10. According to another embodiment of the invention, the following analysis employing steady-state flow equations to approximate flow resistance through the valve 10 may be used to improve the operation of the valve 10. The pressure drop for flow through a hole 18 or 20 in either plate can be estimated using the Hagan-Pouisille equation:

$$\Delta p_{hole} = \frac{128 \mu q t_{plate}}{\pi d_{hole}^3} \qquad \text{[Equation 5]}$$

where µ is the fluid dynamic viscosity, q is the flow rate through the hole, $t_{plate}$ is the plate thickness, and $d_{hole}$ is the hole diameter.

When the valve 10 is in the open position as shown in FIG. 2, the flow of fluid through the gap between the flap 17 and the sealing plate 16 (the same value as the flap gap $d_{gap}$) will propagate generally radially through the gap to a first approximation after exiting the hole 20 in the sealing plate 16 before contracting radially into the hole 18 in the retention plate 14.

Figure 5:
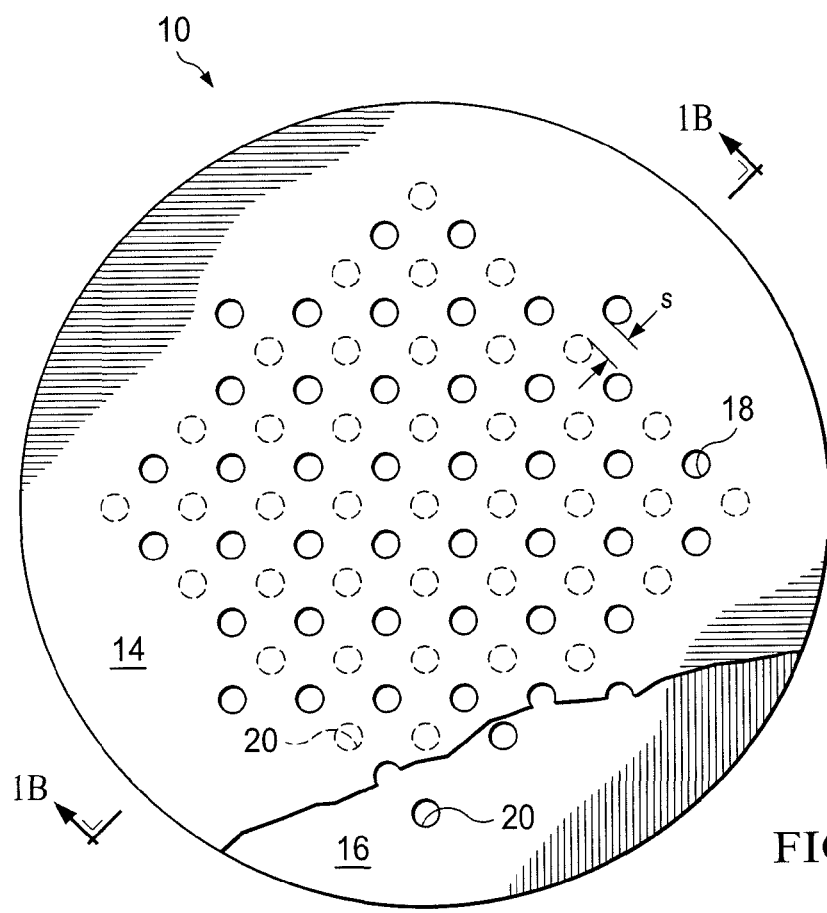
FIG. 5 shows a schematic top view of the valve of FIG. 1B.
Figure 8:
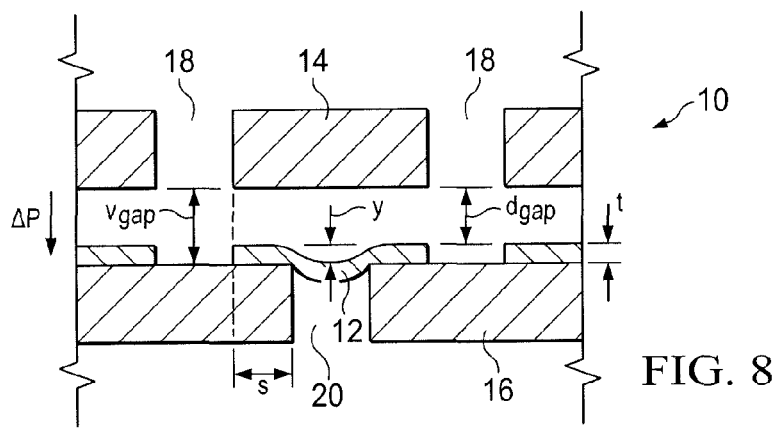
FIG. 8 shows a schematic cross-section view of a portion of the valve of FIG. 1B in the closed position according to an illustrative embodiment.

If the pattern of the holes 18, 20 in both plates is a square array with a sealing length, s, between the holes 18 on the retention plate 14 to the holes 20 on the sealing plate 16 as shown in FIGS. 5 and 8, the pressure drop through the cavity 15 of the valve 10 may be approximated by the following equation:

$$\Delta p_{gap} = \frac{6\mu q}{\pi d_{gap}^3}\ln\left(2\left(\frac{s}{d_{hole}}+1\right)^2\right) \quad \text{[Equation 6]}$$

Thus, the total pressure drop (approximately $\Delta p_{gap}+2*\Delta p_{hole}$) can be very sensitive to changes in the diameter of the holes 18, 20 and the flap gap $d_{gap}$ between the flap 17 and the sealing plate 16. It should be noted that a smaller flap gap $d_{gap}$, which can be desirable in order to minimize the opening time delay ($T_o$) and the closing time delay ($T_c$) of the valve 10, may increase the pressure drop significantly. According to the equation above, reducing the flap gap $d_{gap}$ from 25 microns to 20 microns doubles the pressure loss. In many practical embodiments of the valve, it is this trade-off between response time and pressure drop that determines the optimal flap gap $d_{gap}$ between the flap 17 and the sealing plate 16. In one embodiment, the optimal flap gap $d_{gap}$ falls within an approximate range between about 5 microns and about 150 microns.

In setting the diameter of the holes 20 of the sealing plate 16 consideration should be given both to maintaining the stress experienced by the flap 17 within acceptable limits during operation of the valve 10 (such stresses being reduced by the use of a smaller diameter for the holes 20 of the sealing plate 16) and to ensuring that the pressure drop through the holes 20 does not dominate the total pressure drop through the valve. Regarding the latter consideration, a comparison between equations 5 & 6 above for the hole and gap pressure drops yields a minimum diameter for the holes 20 at which the hole pressure drop is about equal to the valve gap pressure drop. This calculation sets a lower limit on the desirable diameter of the holes 20 above which diameter the hole pressure drop quickly becomes negligibly small. Regarding the former consideration relating to the stress experienced by the flap 17 in operation, FIG. 8 illustrates a portion of the valve 10 of FIG. 1B in the normally closed position. In this position, the flap 17 is subjected to stress as the flap 17 seals and blocks the hole 20 in the sealing plate 16 causing the flap 17 to deform in the shape of a dimple extending into the opening of the holes 20 as illustrated. The level of stress on the flap 17 in this configuration increases with the diameter of the holes 20 in the sealing plate 16 for a given flap 17 thickness. The flap 17 material will tend to fracture more easily if the diameter of the holes 20 is too large, thus leading to failure of the valve 10. In order to reduce the likelihood that the flap 17 material fractures, the hole 20 diameter may be reduced to limit the stress experienced by the flap 17 in operation to a level which is below the fatigue stress of the flap 17 material.

The maximum stress experienced by the flap 17 material in operation may be estimated using the following two equations:

$$\frac{\Delta p_{max} r_{hole}^4}{Et^4} = K_1\frac{y}{t} + K_2\left(\frac{y}{t}\right)^3 \quad \text{[Equation 7]}$$

$$\frac{\sigma_{max} r_{hole}^2}{Et^2} = K_3\frac{y}{t} + K_4\left(\frac{y}{t}\right)^2 \quad \text{[Equation 8]}$$

where $r_{hole}$ is the radius of the hole 20 of the sealing plate 16, t is the flap 17 thickness, y is the flap 17 deflection at the centre of the hole 20, $\Delta p_{max}$ is the maximum pressure difference experienced by the flap 17 when sealed, E is the Young's Modulus of the flap 17 material, and $K_1$ to $K_4$ are constants dependant on the details of the boundary conditions and the Poisson ratio of the flap 17. For a given flap 17 material and geometry of the holes 20, equation 7 can be solved for the deformation, y, and the result then used in equation 8 to calculate stress. For values of y<<t, the cubic and squared y/t terms in equations 7 and 8 respectively become small and these equations simplify to match small plate deflection theory. Simplifying these equations results in the maximum stress being proportional to the radius of the holes 20 squared and inversely proportional to the flap 17 thickness squared. For values of y>>t or for flaps that have no flexural stiffness, the cubic and squared y/t terms in the two equations become more significant so that the maximum stress becomes proportional to the hole 20 radius to the power 2/3 and inversely proportional to the flap 17 thickness to the power 2/3.

In one embodiment of the invention, the flap 17 is formed from a thin polymer sheet, such as Mylar having a Poisson ratio of 0.38, and is clamped to the sealing plate 16 at the edge of the holes 20. The constants $K_1$ to $K_4$ can be estimated as 6.23, 3.04, 4.68 and 1.73, respectively. Using these values in equations 7 and 8 and assuming that the thickness of the flap 17 is about 3 microns with a Young's Modulus of 4.3 GPa under 500 mbar pressure difference, the deflection (y) of the flap 17 will be approximately 1 µm for a hole radius of 0.06 mm, about 4 µm for a hole radius of 0.1 mm, and about 8 µm for a hole radius of 0.15 mm. The maximum stresses under these conditions will be 16, 34 and 43 MPa, respectively. Considering the high number of stress cycles applied to the flap 17 during the operation of the valve 10, the maximum stress per cycle tolerated by the flap 17 should be significantly lower than the yield stress of the flap 17 material in order to reduce the possibility that the flap 17 suffers a fatigue fracture, especially at the dimple portion of the flap 17 extending into the holes 20. Based on available fatigue data compiled for polymer materials for a high number of cycles, it has been estimated that the yield stress of the flap 17 material should be at least about four times greater than the cyclic stress applied to the flap 17 material in operation (e.g., 16, 34 and 43 MPa as calculated above). Thus, the flap 17 material should have a yield stress of at least around 150 MPa to minimize the likelihood of such fractures for a maximum hole diameter in this case of approximately 200 microns.

Reducing the diameter of the holes 20 beyond this point may be desirable as it further reduces flap 17 stress and has no significant effect on valve flow resistance until the diameter of the holes 20 approaches the same size as the flap gap $d_{gap}$, at which point the hole pressure drop begins to dominate the total pressure drop through the valve. Further, reduction in the diameter of the holes 20 permits the inclusions of an increased number of holes 20 per unit area of the valve 10 surface for a given sealing length (s). However, the size of the diameter of the holes 20 may be limited, at least in part, by the manner in which the plates of the valve 10 were fabricated. For example, chemical etching limits the diameter of the holes 20 to be greater than approximately the thickness of the plates in order to achieve repeatable and controllable etching results. In one embodiment, the trade-off between the factors described above leads to the holes 20 in the sealing plate 16 being between about 20 microns and about 500 microns in diameter. In one embodiment, the retention plate 14 and the sealing plate 16 are formed from sheet steel about 100 microns thick, and the holes 18, 20 are about 150 microns in diameter. In this embodiment the valve flap is formed from polyethylene terephthalate (PET) and is about 3 microns thick. The valve gap ($v_{gap}$) between the sealing plate 16 and the retention plate 14 is around 25 microns.

Figure 9:
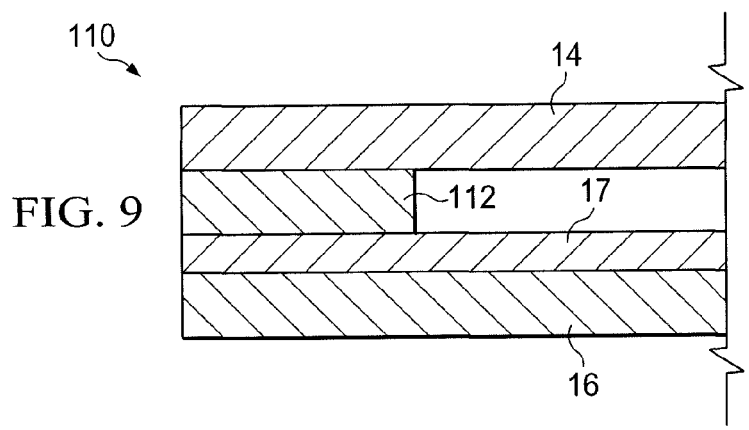
FIG. 9 shows a schematic cross-section view of an end portion of the valve of FIG. 1B having a spacer shim according to an illustrative embodiment.
Figure 10:
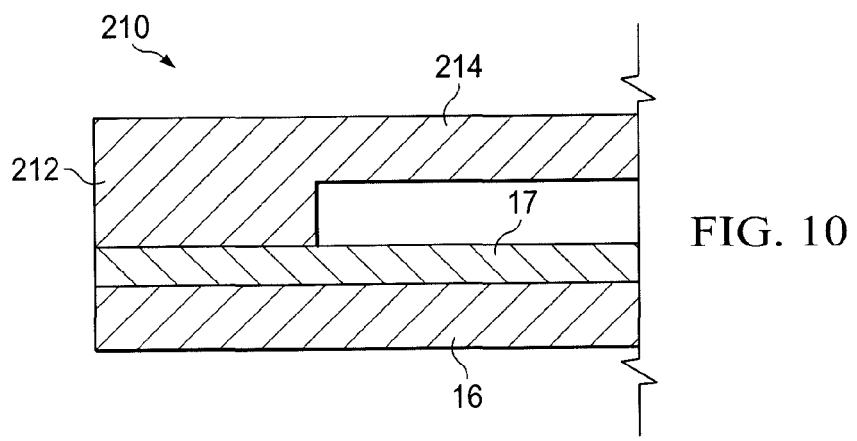
FIG. 10 shows a schematic cross-section view of an end portion of the valve of FIG. 1B according to an illustrative embodiment.

FIGS. 9 and 10 illustrate two embodiments of an edge portion of the valve 10 in FIGS. 1-5. FIG. 9 shows a first embodiment of the valve 10, valve 110, comprising a spacer shim 112 disposed between the flap 17 and the retention plate 14. In this structural configuration, the flap 17 is biased against the sealing plate 16 when the valve 110 is not in use. The spacer shim 112 may be formed as a separate component from any suitable rigid material such as glass, silicon, ceramic, or metal. In one embodiment, the spacer shim 112 is a separate component formed by chemical etching from steel sheet. The spacer shim 112 has a substantially annular shape around the periphery of the valve 110. The valve 110, which comprises sealing plate 16, flap 17, and retention plate 14 as described above, and the spacer shim 112, may be fixed together by any suitable means, including gluing, soldering, electrical spot-welding or seam-welding, or laser spot-welding or seam-welding. In an alternative embodiment, the spacer shim 112 may be disposed between the flap 17 and the sealing plate 16. In this alternative embodiment, the flap 17 is biased against the retention plate 14 when the valve 110 is not in use. FIG. 10 shows a second embodiment of the valve 10, valve 210, comprising a modified retention plate 214 that includes a peripheral annular portion formed as a spacer shim 212. The separation between the valve plates may also be determined, at least in part, by an adhesive layer between the valve plates. The adhesive may be loaded with spheres of a rigid material having a tightly controlled diameter. Compression of the glue bond may thereby fix the spacing of the valve plates equal to the desired spacing.

Figure 11A:
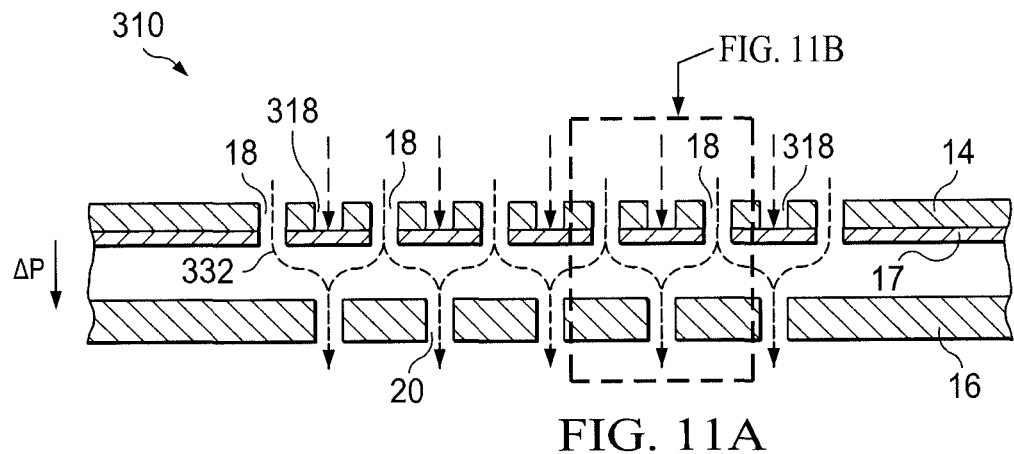
FIG. 11A shows a schematic cross-section view of a modified version of the valve of FIG. 1B having release apertures.
Figure 11B:
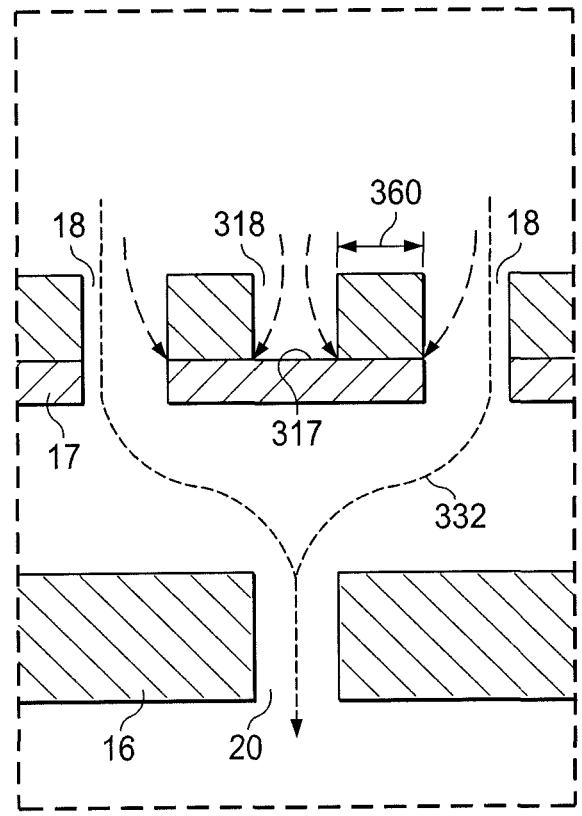
FIG. 11B shows a schematic cross-section view of a portion of the valve in FIG. 11A.

FIGS. 11A and 11B illustrate yet another embodiment of the valve 10, valve 310, comprising release holes 318 extending through the retention plate 14 between the holes 18 in the retention plate 14. The release holes 322 facilitate acceleration of the flap 17 away from the retention plate 14 when the differential pressure across the valve 310 changes direction, thereby further reducing the response time of the valve 310, i.e., reducing the closing time delay ($T_c$). As the differential pressure changes sign and reverse flow begins (as illustrated by dashed arrows 332), the fluid pressure between the flap 17 and the sealing plate 12 decreases and so the flap 17 moves away from the retention plate 14 towards the sealing plate 16. The release holes 318 expose the outside surface 317 of the flap 17 in contact with the retention plate 14 to the pressure differential acting to close the valve 310. Also, the release holes 318 reduce the distance 360 that fluid must penetrate between the retention plate 14 and the flap 17 in order to release the flap 17 from the retention plate 14 as illustrated in FIG. 11B. The release holes 318 may have a different diameter than the other holes 18, 20 in the valve plates. In FIGS. 11A and 11B, the retention plate 14 acts to limit the motion of the flap 17 and to support the flap 17 in the open position while having a reduced surface contact area with the surface 360 of the flap 17.

Figure 12A:
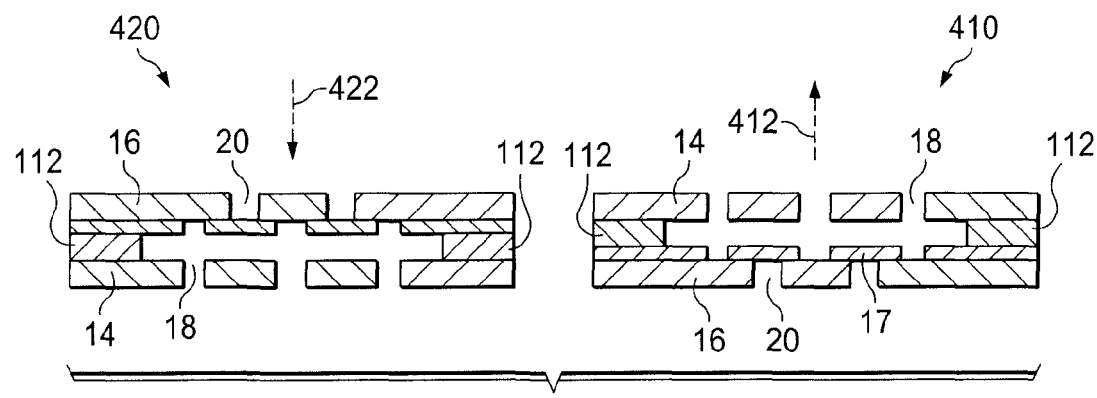
FIG. 12A shows a schematic cross-section view of two valves of FIG. 9, one of which is reversed to allow fluid flow in the opposite direction from the other according to an illustrative embodiment.
Figure 12B:
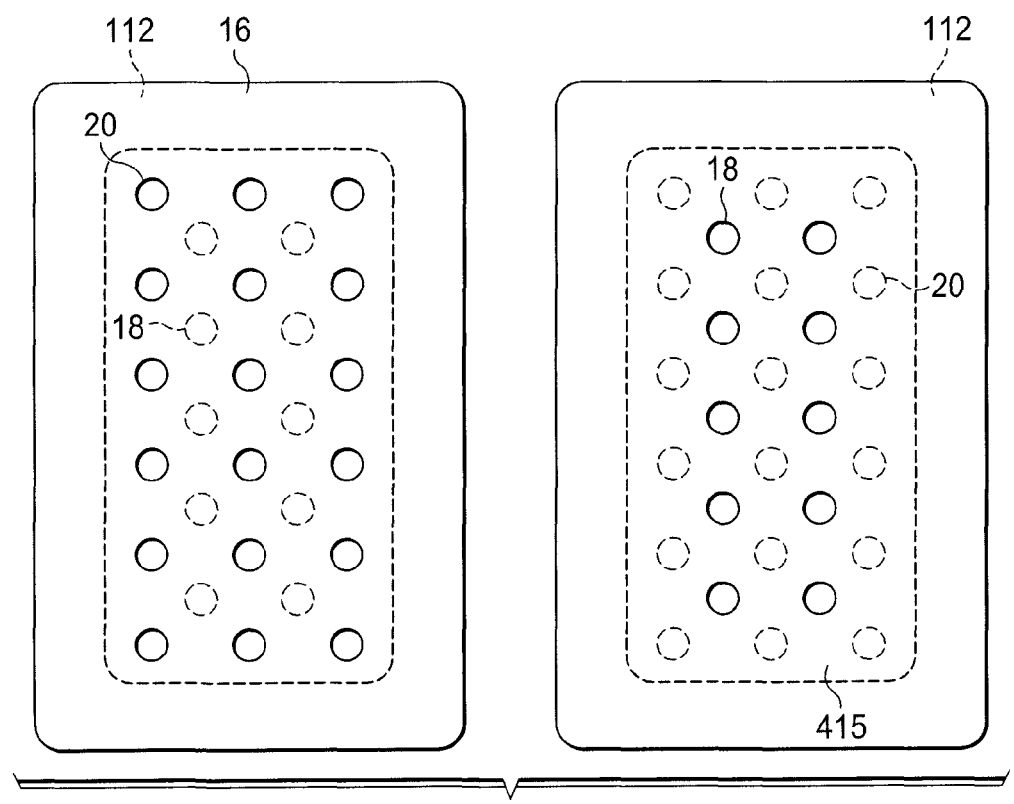
FIG. 12B shows a schematic top view of the valves shown in FIG. 12A.
Figure 12C:
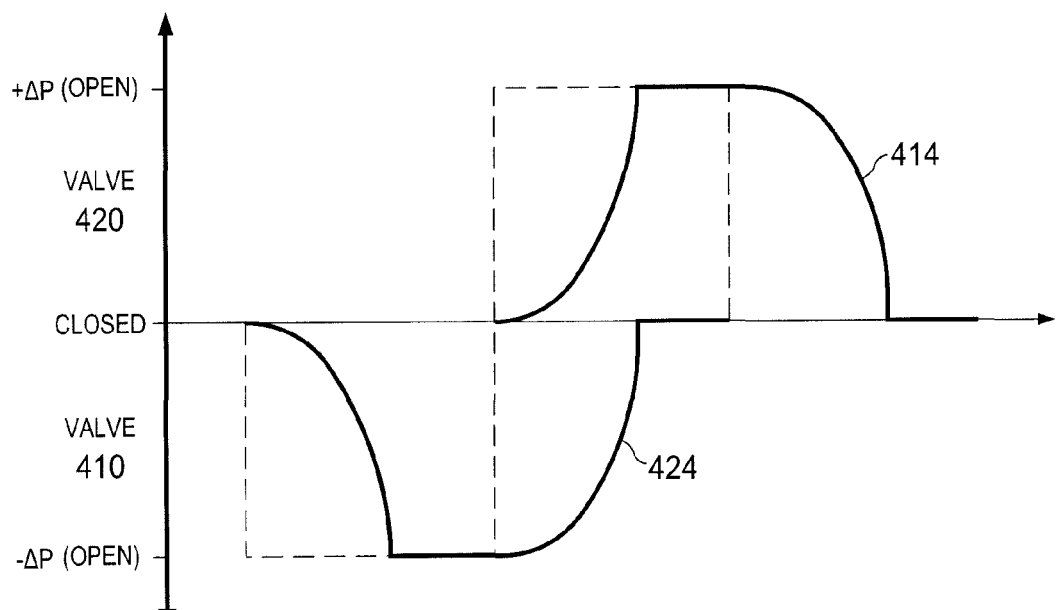
FIG. 12C shows a graph of the operating cycles of the valves of FIG. 12A between an open and closed position.

FIGS. 12A and 12B show two valves 110 (see FIGS. 1 and 9) wherein one valve 410 is oriented in the same position as the valve 110 of FIG. 9 and the other valve 420 is inverted or reversed with the retention plate 14 on the lower side and the sealing plate 16 on the upper side. The valves 410, 420 operate as described above with respect to valve 10 of FIGS. 1-5, but with the air flows in opposite directions as indicated by arrow 412 for the valve 410 and arrow 422 for the valve 420 wherein one valve acts as an inlet valve and the other acts as an outlet valve. FIG. 12C shows a graph of the operating cycle of the valves 410, 420 between an open and closed position that are modulated by the square-wave cycling of the pressure differential ($\Delta P$) as illustrated by the dashed lines (see FIGS. 7A and 7B). The graph shows a half cycle for each of the valves 410, 420 as it opens from the closed position. When the differential pressure across the valve 410 is initially negative and reverses to become a positive differential pressure ($+\Delta P$), the valve 410 opens as described above and shown by graph 414 with fluid flowing in the direction indicated by the arrow 412. However, when the differential pressure across the valve 420 is initially positive and reverses to become a negative differential pressure ($-\Delta P$), the valve 420 opens as described above and shown by graph 424 with fluid flowing in the opposite direction as indicated by the arrow 422. Consequently, the combination of the valves 410, 420 function as a bi-directional valve permitting fluid flow in both directions in response to the cycling of the differential pressure ($\Delta P$). The valves 410, 420 may be mounted conveniently side by side within the primary aperture 68 of the pump 60 to provide fluid flow in the direction indicated by the solid arrow in the primary aperture 68 as shown in FIG. 6 for one half cycle, and then in the opposite direction (not shown) for the opposite half cycle.

Figure 13:
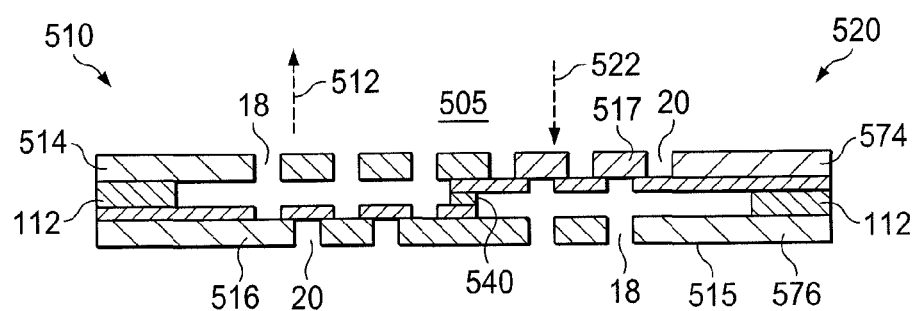
FIG. 13 shows a schematic cross-section view of the a bi-directional valve having two valve portions that allow fluid flow in opposite directions with both valve portions having a normally-closed position according to an illustrative embodiment.
Figure 15:
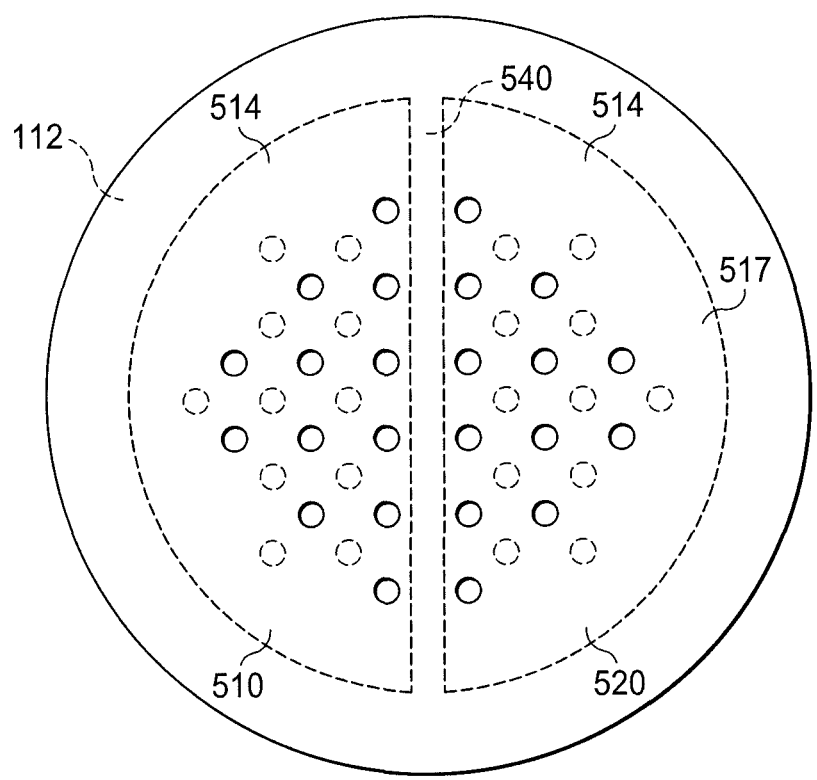
FIG. 15 shows a schematic top view of the bi-directional valves of FIG. 13.

FIGS. 13 and 15 show yet another embodiment of the valves 410, 420 of FIG. 12A in which two valves 510, 520 corresponding to valves 410, 420, respectively, are formed within a single structure 505. Essentially, the two valves 510, 520 share a common wall or dividing barrier 540 which in this case is formed as part of the spacer shim 112, although other constructions may be possible. When the differential pressure across the valve 510 is initially negative and reverses to become a positive differential pressure ($+\Delta P$), the valve 510 opens from its normally closed position with fluid flowing in the direction indicated by the arrow 512. However, when the differential pressure across the valve 520 is initially positive and reverses to become a negative differential pressure ($-\Delta P$), the valve 520 opens from its normally closed position with fluid flowing in the opposite direction as indicated by the arrow 522. Consequently, the combination of the valves 510, 520 function as a bi-directional valve permitting fluid flow in both directions in response to cycling of the differential pressure ($\Delta P$).

Figure 14:
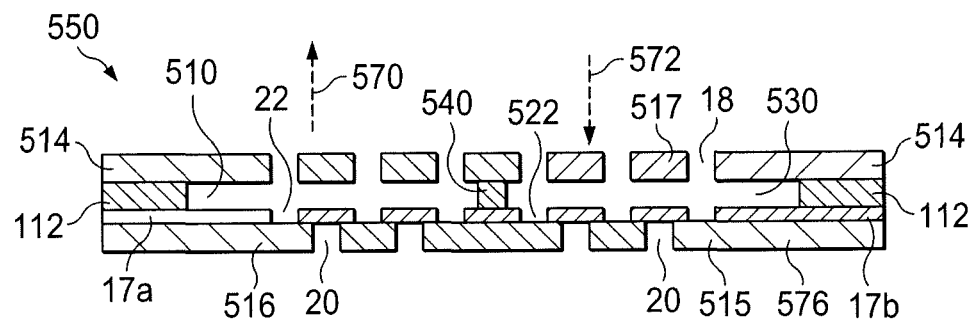
FIG. 14 shows a schematic cross-section view of a bi-directional valve having two valve portions that allow fluid flow in opposite directions with one valve portion having a normally closed position and the other having a normally open position according to an illustrative embodiment.

FIGS. 14 and 15 show yet another embodiment of a bi-directional valve 555 having a similar structure as the bi-directional valve 505 of FIG. 14. Bi-directional valve 551 is also formed within a single structure having two valves 510, 530 that share a common wall or dividing barrier 560 which is also formed as part of the spacer shim 112. The valve 510 operates in the same fashion as described above with the flap 17 shown in the normally closed position blocking the holes 20 as also described above. However, the bi-directional valve 550 has a single flap 17 having a first flap portion 17a within the valve 510 and a second flap portion 17b within the valve 530. The second flap portion 17b is biased against the plate 516 and comprises holes 522 that are aligned with the holes 20 of the plate 516 rather than the holes 18 of the plate 514 unlike the valves described above. Essentially, the valve 30 is biased by the flap portion 17b in a normally open position as distinguished from the normally closed position of other valves described above. Thus, the combination of the valves 510, 530 function as a bi-directional valve permitting fluid flow in both directions in response to the cycling of the differential pressure ($\Delta P$) with the two valves opening and closing on alternating cycles.

It should be apparent from the foregoing that an invention having significant advantages has been provided. While the invention is shown in only a few of its forms, it is not just limited but is susceptible to various changes and modifications without departing from the spirit thereof.

We claim:

1. A valve for controlling the flow of fluid, said valve comprising: a first plate having apertures extending generally perpendicular through said first plate; a second plate having first apertures extending generally perpendicular through said second plate, the first apertures being substantially offset from the apertures of said first plate; wherein the apertures in the first and second plates are less than 500 µm in diameter; a spacer disposed between said first plate and said second plate to form a cavity therebetween in fluid communication with the apertures of said first plate and the first apertures of said second plate; and, a flap disposed and moveable between said first plate and said second plate, said flap having apertures substantially offset from the apertures of said first plate and substantially aligned with the first apertures of said second plate; whereby said flap is motivated between said first and second plates in response to a change in direction of the differential pressure of the fluid across said valve; and wherein the flap thickness ($\delta_{flap}$) satisfies the following:

$$\delta_{flap} < \frac{P}{2 d_{gap}} \frac{1}{16 f^2} \frac{1}{\rho_{flap}}$$

where P is the amplitude of the oscillating pressure wave, $d_{gap}$ is the flap gap, f is the frequency of the applied pressure differential oscillation and $\rho_{flap}$ is the density of the flap material.

2. The valve of claim 1, wherein said second plate comprises second apertures extending generally perpendicular through said second plate and being spaced between the first apertures of said second plate, whereby the second apertures are offset from the apertures of said flap.

3. The valve of claim 1, wherein said flap is disposed adjacent either one of said first and second plates in a first position when the differential pressure is substantially zero and movable to the other one of said first and second plates in a second position when a differential pressure is applied, whereby said flap is motivated from the first position to the second position in response to a change in direction of the differential pressure of the fluid across said valve and back to the first position in response to a reversal in the direction of the differential pressure of the fluid.

4. The valve of claim 3, wherein said flap is disposed adjacent said second plate in a normally open position, whereby the fluid flows through said valve when said flap is in the first position and the flow of the fluid is blocked by said valve when said flap is in the second position.

5. The valve of claim 4, wherein said second plate further comprises second apertures extending generally perpendicular through said second plate and spaced between the first apertures of said second plate, whereby the second apertures are offset from the apertures of said flap when in the second position.

6. The valve of claim 3, wherein said flap is disposed adjacent said first plate in a normally closed position, whereby the flow of the fluid is blocked by said valve when said flap is in the first position and the fluid flows through said valve when said flap is in the second position.

7. The valve of claim 4, wherein said second plate further comprises second apertures extending generally perpendicular through said second plate and spaced between the first apertures of said second plate, whereby the second apertures are offset from the apertures of said flap when in the second position.

8. A valve according to claim 1, wherein said first and second plates are formed from a substantially rigid material selected from the group consisting of metal, plastic, silicon, and glass.

9. A valve according to claim 8, wherein the metal is steel having a thickness between 100 and 200 microns.

10. A valve according to claim 1, wherein said flap and either one of said first and second plates are separated by a distance between 5 microns and 150 microns when said flap is disposed adjacent to the other said plate.

11. A valve according to claim 10, wherein said flap is formed from a polymer having a thickness of 3 microns and the distance between said flap and either one of said first and second plates is between 15 microns and 50 microns when said flap is disposed adjacent to the other said plate.

12. A valve according to claim 1, wherein said flap is formed from a light-weight material selected from the group consisting of a polymer and metal.

13. A valve according to claim 12, wherein the light-weight material is a polymer having a thickness of less than 20 microns.

14. A valve according to claim 13, wherein the polymer is polyethylene terephthalate (PET) or a liquid crystal film having a thickness of 3 microns.

15. A valve according to claim 1, wherein the apertures in said first plate are less than 500 microns in diameter.

16. A valve according to claim 1, wherein said flap is formed from a polymer having a thickness of 3 microns and the first apertures in said first plate are less than 150 microns in diameter.

17. A valve according to claim 1, wherein said first and second plates are formed from steel having a thickness of 100 microns, and wherein the apertures of said first plate, the first apertures of said second plate and the apertures of said flap are 150 microns in diameter, and wherein said flap is formed from a polymer film having a thickness of 3 microns.

18. A valve according to claim 1, wherein said first and second plates, said spacer, and said flap comprise a first valve portion, said spacer of the first valve portion is a first spacer, and said flap of the first valve portion is a first flap, said valve further comprising a second valve portion comprising:

a third plate having apertures extending generally perpendicular through said first plate;

a fourth plate having first apertures extending generally perpendicular through said fourth plate, the first apertures being substantially offset from the apertures of said third plate;

a second spacer disposed between said third plate and said fourth plate to form a cavity therebetween in fluid communication with the apertures of said third plate and the first apertures of said fourth plate; and a second flap disposed and moveable between said third plate and said fourth plate, said second flap having apertures substantially offset from the apertures of said third plate and substantially aligned with the first apertures of said fourth plate;

whereby said second flap is motivated between said third and fourth plates in response to a change in direction of the differential pressure of the fluid across said valve; and wherein said first and second valve portions are oriented with respect to the differential pressure to permit fluid to flow through said two portions of said valve in opposite directions in response to cycling of the differential pressure of the fluid across said valve.

19. The valve of claim 18, wherein said first and second flaps of each valve portion are disposed adjacent either one of said first and second plates and said third and fourth plates, respectively in a first position when the differential pressure is substantially zero and moveable to the other one of said first and second plates and said third and fourth plates, respectively, in a second position when a differential pressure is applied, whereby each of said first and second flaps is motivated from the first position to the second position in response to a change in direction of the differential pressure of the fluid across said valve and back to the first position in response to a reversal in direction of the differential pressure of the fluid.

20. The valve of claim 18, wherein said first and second valve portions are oriented in opposite directions respecting the differential pressure, and said first or second flap of each first or second valve portion, respectively, is disposed adjacent said second plate or said fourth plate, respectively, in a normally open position, whereby the fluid flows through each of said first or second valve portions when said first or second flaps are in the first position and the flow of the fluid is blocked by said first or second valve portions when said first or second flaps are in the second position.

21. The valve of claim 18, wherein said first and second valve portions are oriented in opposite directions respecting the differential pressure, and said first or second flap of each first or second valve portion is disposed adjacent said first plate or said third plate, respectively, in a normally closed position, whereby the flow of the fluid is blocked by said first or second valve portions when said first or second flaps are in the first position and the fluid flows through said first or second valve portions when said first or second flaps are in the second position.

22. The valve of claim 18, wherein said first and second valve portions are oriented in opposite directions respecting the differential pressure, said first flap of said first valve portion being disposed adjacent said first plate in a normally closed position whereby the flow of the fluid is blocked by said first valve portion when said first flap is in the first position and the fluid flows through said first valve portion when said first flap is in the second position, and said second flap of said second valve being disposed adjacent said fourth plate in a normally open position whereby the fluid flows through said second valve portion when said second flap is in the first position and the flow of the fluid is blocked by said second valve portion when said second flap is in the second position.

23. A valve according to claim 1, wherein the flap has a thickness of less than 20 μm.

24. A bi-directional valve for controlling the flow of fluid in two directions, said bi-directional valve comprising at least two valve portions for controlling the flow of fluid, each of said valve portions comprising: a first plate having first apertures extending generally perpendicular through said first plate; a second plate having first apertures extending generally perpendicular through said second plate, the first apertures being substantially offset from the first apertures of said first plate; wherein the apertures in the first and second plates are less than 500 μm in diameter; a sidewall disposed between said first and second plates, said sidewall being closed around the perimeter of said first and second plates to form a cavity between said first and second plates in fluid communication with the first apertures of said first and second plates; and a flap disposed and moveable between said first and second plates, said flap having apertures substantially offset from the first apertures of said first plate and substantially aligned with the first apertures of said second plate; whereby said flap is motivated between said first and second plates in response to a change in direction of the differential pressure of the fluid across said: valve; wherein said first and second valve portions are oriented with respect to the differential pressure to permit fluid to flow through said two portions of said valve in opposite directions in response to cycling of the differential pressure of the fluid across said valve; and wherein the flap thickness ($\delta_{flap}$) satisfies the following:

$$\delta_{flap} < \frac{P}{2d_{gap}} \frac{1}{16f^2} \frac{1}{\rho_{flap}}$$

where P is the amplitude of the oscillating pressure wave, $d_{gap}$ is the flap gap, f is the frequency of the applied pressure differential oscillation and $\rho_{flap}$ is the density of the flap material.

25. The bi-directional valve of claim 24, wherein said flap of each valve portion is disposed adjacent either one of said first and second plates in a first position when the differential pressure is substantially zero and moveable to the other one of said first and second plates in a second position when a differential pressure is applied, whereby each of said flaps are motivated from the first position to the second position in response to a change in direction of the differential pressure of the fluid across said valve and back to the first position in response to a reversal in the direction of the differential pressure of the fluid.

26. The bi-directional valve of claim 24, wherein the flap has a thickness of less than 20 μm.

* * * * *